Figure 1:
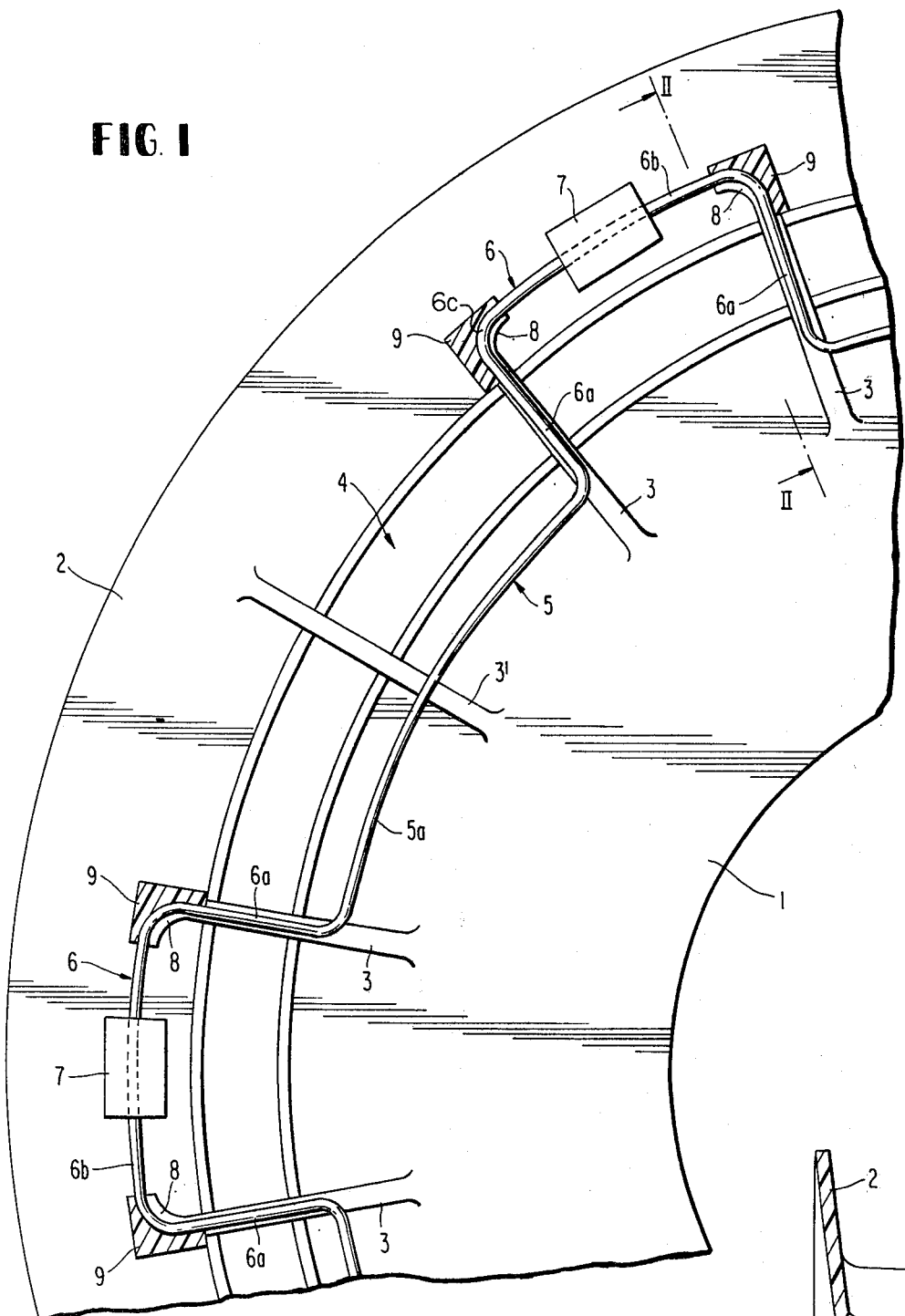

United States Patent [19]

Enke

[11] 4,366,992

[45] Jan. 4, 1983

[54] WHEEL COVER FOR A PASSENGER MOTOR VEHICLE

[75] Inventor: Kurt Enke, Kirchheim, Fed. Rep. of Germany

[73] Assignee: Daimler-Benz Aktiengesellschaft, Stuttgart, Fed. Rep. of Germany

[21] Appl. No.: 200,466

[22] Filed: Oct. 24, 1980

[30] Foreign Application Priority Data

Oct. 25, 1979 [DE] Fed. Rep. of Germany ....... 2943137

[51] Int. Cl.³ .............................................. B60B 7/06
[52] U.S. Cl. ............................. 301/37 P; 301/37 PB
[58] Field of Search ................. 301/6 CS, 37 R, 37 P, 301/37 TP, 37 PB, 108 R, 108 A; 220/320; 292/256.6, 256.61, 256.65

[56] References Cited

U.S. PATENT DOCUMENTS

| | | | |
|---|---|---|---|
| 771,740 | 10/1904 | McKeel | 301/108 R |
| 3,031,232 | 4/1962 | Dies | 301/37 PB |
| 3,663,064 | 5/1972 | McCarroll | 301/37 R |
| 4,027,919 | 6/1977 | Foster et al. | 301/37 TP |

*Primary Examiner*—H. Grant Skaggs
*Attorney, Agent, or Firm*—Paul M. Craig, Jr.

[57] ABSTRACT

A wheel cover for passenger motor vehicles with a mounting member fashioned as a wire spring ring. The wire spring ring is provided with radially outwardly projecting bracket members which are guided at the hub cap and are lockable into a recess at a rim of a wheel. Two mutually concentrically arranged hubcap sections are provided which cover the rim of the wheel and form between them an annular vent slot. The hubcap sections are connected to each other by webs. An inner hubcap section covers the wire spring ring and the webs are arranged axially in front of braces of a bracket member, which braces emanate toward the outside from the circular ring shape of the wire ring.

11 Claims, 2 Drawing Figures

WHEEL COVER FOR A PASSENGER MOTOR VEHICLE

The present invention relates to a wheel cover and, more particularly, to a wheel cover for the wheels of a passenger motor vehicle which includes a mounting member fashioned as a wire spring ring provided with radially outwardly projecting bracket members, with the bracket members being adapted to be guided at the wheel cover and being lockable in a recess of a rim of the wheel.

Wheel covers of the aforementioned type are proposed in, for example, U.S. Pat. No. 2,746,805 and Auslegeschrift No. 2,622,908 wherein the wheel cover proper consists of a continuous disk part completely covering the rim of the wheel at the front thereof so that the resilient wire ring and detent bracket members cannot be seen from outside of the wheel.

Wheel covers of a different type of construction have also been proposed wherein the wheel cover consists of two sections which define therebetween a venting slot having a shape of a circular ring, through which venting slot cooling air may enter to the interior of the wheel rim and pass from there to the brakes or be exhausted in a reverse direction. If these last proposed wheel covers are equipped with mounting elements or devices employing a wire spring ring, a problem can occur in that portions of the wire spring ring are visible toward the outside of the wheel which must be avoided for esthetic reasons.

A further disadvantage of the use of wire spring rings in the last mentioned proposed wheel covers resides in the fact that the mounting elements are not only visible but may be reached from the outside or even damaged by unauthorized persons. This would be particularly true if the wire spring ring, serving for mounting purposes, is equipped with bracket members which project relatively far radially towrd the outside. The use of such bracket members is advantageous in that the entire wire spring ring is deformed during a mounting of the wheel cover to the rim of the wheel and thus has a soft spring characteristic. However, the relatively long braces of the bracket members, leading from an inner circular ring-shaped wire ring section toward the outside to a larger diameter, are visible through the vent slots so that the aforementioned disadvantages are especially troublesome in such types of constructions.

The aim underlying the present invention essentially resides in providing a wheel cover, having a vent slot with the wheel cover being adapted to be attached by means of a wire spring ring without the spring ring being visible from outside of the wheel cover.

In accordance with advantageous features of the present invention, two mutually concentrically arranged wheel cover or hubcap sections or members are provided which are adapted to cover a wheel of the rim and are arranged, in a conventional manner, so as to form between them an annular vent slot. The wheel cover sections are connected to each other by webs with an inner wheel cover section being adapted to cover the wire spring ring. The webs are arranged axially in front of the braces of the bracket members, which braces emanate toward the outside from a circular ring-shape of the wire ring.

By virtue of the above noted features of the present invention, the bracket members and/or associated braces come to lie behind the webs of the hubcap, which webs can be suitably dimensioned so that they cover the wire ring including the associated bracket members completely toward the outside and also secure these components against unauthorized acess or damaging. Moreover, the construction of a wheel cover in such fashion enables the safe location of the resilient mounting element behind the sections of the wheel cover and, advantageously, a wheel cover may be realized which is esthetically styled.

To secure the location of the spring wire ring and bracket members, advantageously, in accordance with further features of the present invention, the webs lying in front of the braces are provided with a guide means for securing a position of the braces in a circumferential direction. With wire spring rings inserted under a pretensioning, advantageously the guide means may be fashioned as a radial stop and it is especially simple to construct the guide means as an arcuate inner groove with two bearings broadening the webs at the outer end. By virtue of this construction, the entire wire spring ring may be axially as well as radially secure and secured in the circumferential direction, which need not be absolutely accomplished by arranging arcuate inner grooves at one location together but may also be effected in separate locations of the webs or also between the webs at the inner wheel cover section, in part.

For example, it is possible to arrange the radial stops for the spring wire ring, inserted under a pretensioning, at the inner wheel cover sections so that it is merely necessary to provide one guide means in the circumferential direction and axially at the webs or at other suitable locations.

In the aforementioned arrangement with bearings disposed at the outer ends of the webs for the brackets and thus for the entire wire spring ring, it is advantageous that the bearings be manufactured integrally with the webs of the same material so that an especially simple manufacturing is possible. A suitable material may, for example, be a synthetic resinous material.

In accordance with further features of the present invention, it is advantageous to make the bracket members of two radially oriented braces and one cross web connecting the same and to arrange the webs of the wheel cover sections radially and axially in front of the braces. This arrangement permits a very pleasing styling configuration when the braces may extend in a star shape toward the outside.

It is advantageous in the last mentioned construction to arrange six bracket members distributed uniformly over a circumference of the wire spring ring and to select an angular spacing of the braces in the circumferential direction so that respectively one web of the wheel cover sections is located between two webs of the wheel cover sections covering a brace of a bracket member. By adapting the construction of the wire spring ring to the configuration of the wheel cover, a stylistically pleasing hubcap can thus be obtained wherein the mounting device consisting of a wire spring ring is not visible nor accessible from outside of the wheel.

Accordingly, it is an object of the present invention to provide a wheel cover for a passenger motor vehicle which avoids, by simple means, shortcomings and disadvantages encountered in the prior art.

Another object of the present invention resides in providing a wheel cover for a passenger motor vehicle which includes a venting slot and which may be attached by means of a wire spring ring without the wire spring ring being visible from outside of the wheel cover.

Yet another object of the present invention resides in providing a slotted wheel cover for a passenger motor vehicle which prevents unauthorized access to mounting elements of the wheel cover through the slot therein.

A further object of the present invention resides in providing a wheel cover for a passenger motor vehicle which is simple in construction and therefore relatively inexpensive to manufacture.

Figure 2:
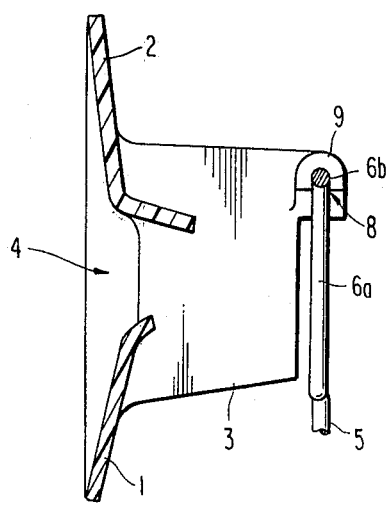

These and other objects, features, and advantages of the present invention will become more apparent from the following description when taken in connection with the accompanying drawings which shows, for the purposes of illustration only, one embodiment in accordance with the present invention, and wherein:

FIG. 1 is a fragmentary rear view of a wheel cover in accordance with the present invention during an installation at a rim of a wheel; and FIG. 2 is a partial cross sectional view taken along the line II—II in FIG. 1.

Referring now to the drawing wherein like reference numerals are used in both views to designate like parts and, more particularly, to FIG. 1, according to this Figure, a wheel cover includes an inner annular or disk-shaped wheel cover section or member and an outer annular or disk-shaped hubcap section or member 2. The sections or members 1, 2 are made of a synthetic resinous material and are firmly joined together by radially extending webs 3. The wheel cover sections 1, 2 are arranged so as to define therebetween an annular circular vent slot generally designated by the reference numeral 4. The thus produced vent slot is respectively subdivided into individual zones interrupted by the radially extending webs 3. A wire spring ring generally designated by the reference numeral 5 is arranged in an interior of the wheel cover. The wire spring ring 5 includes a plurality of circular arc-shaped sections 5a disposed between bracket members generally designated by the reference numeral 6 which project from the circular arc-shaped sections 5a radially outwardly toward the outside. If, for example, six bracket members or sections 6 are provided uniformly along the circumference of the wire spring ring 5, the respective bracket members 6 would have a mutual annular distance of 60°.

Each bracket member 6 includes radially outwardly oriented braces 6a and a cross web 6b connecting the braces 6a on the outside thereof. In the illustrated embodiment, a cover 7, firmly joined to the wheel cover section 2 but elastically movable with respect thereto, extends on an outside over the cross web 6b of each bracket member 6. The two arcuate transition portions 6c between the respective braces 6a and cross web 6b are adapted to be inserted in an arcuate inner groove 8 of a bearing 9, with the bearing 9 broadening the outer end of the respective webs. As shown in FIG. 2, the bearing 9 is integrally formed with the wheel cover section 2 and with the webs 3, which webs are respectively associated with the braces 6a of each bracket member 6.

As shown in FIG. 1, the webs 3 are arranged so that they lie axially in front of the braces 6a of the wire spring ring 5. The position of the braces 6a is adapted to the position of the webs 3 which means, in the illustrated embodiment, the mutual angular distance of the braces 6a of a bracket member 6 is chosen to be exactly of the same size as the angular distance between the webs 3 and/or between the webs 3 and webs 3' lying respectively between two bracket members 6. Since the webs 3' and 3 in the illustrated embodiment extend radially, the braces 6a of the brackets 6 of the wire spring ring 5 are likewise disposed so as to extend in a radial direction.

During an installation of the wheel cover, the covers 7 are urged into a continuous indentation (not shown) of a wheel rim (not shown) and the covers press the cross webs 6b and, through the braces 6a, the other parts of the wire spring ring 5 toward the inside of the wheel cover. The wheel cover is then held in the axial direction by the feature that the bracket members 6 are guided in the inner groove 8 of the bearings 9.

Thus, in the illustrated example, the bearings 9 take over the axial guidance of the wire spring ring 5 at the wheel cover as well as the mounting of the ring in a circumferential direction. Furthermore, the bearings 9 take over the function of an abutment in the radial direction if the wire spring ring 5, as in the case of the illustrated embodiment, is seated under a pretensioning in the wheel cover prior to being mounted to the rim of the wheel and additional mounting means are not necessary.

Of course it is also possible to provide a radial stop for the wire spring ring 5 to be inserted under a pretensioning and this may be accomplished at, for example, the bend or arcuate portions 5b provided between the parts 5a and the associated braces 6a or at the webs 3' disposed between two bracket members 6. In this case, only an axial and circumferential securing action would have to be effected by the bearings 9 or by other corresponding parts. However, the illustrated embodiment exhibits the advantage that the wire spring ring 5 is firmly guided in direct proximity of the locations which lock into the wheel rim so that an especially secure mounting is attained.

The above described arrangement of the present invention has a further advantage that the braces 6a of the bracket members 6 of the wire spring ring 5 cannot be seen from the outside and also are secure from being touched since such braces lie behind the webs 3. Another advantage is the fact that the bearings 9, which take over the entire guidance of the bracket members 6 and of the wire spring ring 5 may be integrally manufactured with the webs 3. For example, the bearings 9 may be injection molded in one piece of a synthetic resinous material so that the manufacturer is likewise greatly simplified.

It would also be possible to arrange the webs 3, 3' in such a manner so that rather than extending radially outwardly toward the outside the webs 3, 3' may, for example, have an oblique orientation in order to attain a kind of fan effect. With such an arrangement the braces 6a of the associated bracket member 6 would have to be likewise arranged in a correspondingly oblique direction; however, the illustrated example is especially advantageous from the point of view of the transmission of forces which are necessarily applied to the wheel cover.

While I have shown and described only one embodiment in accordance with the present invention, it is understood that the same is not limited thereto but is susceptible of numerous changes and modifications as known to one having ordinary skill in the art, and I therefore do not wish to be limited to the details shown and described herein, but intend to cover all such modifications as are encompassed by the scope of the appended claims.

I claim:

1. A wheel cover for passenger motor vehicles, the wheel cover including wire spring ring means for enabling a mounting of the wheel cover to a rim of a wheel, the wire spring ring means includes a plurality of circumferentially spaced radially outwardly projecting bracket members adapted to be locked in a recess of the rim of the wheel, characterized in that the wheel cover comprises at least two independent mutually concentrically disposed wheel cover members respectively forming an inner and outer wheel cover member, a plurality of circumferentially spaced web means for connecting the inner and outer wheel cover members to each other so as to define at least one vent slot between the wheel cover members, the spring ring means includes circular shaped sections respectively disposed between adjacent bracket members, the bracket members each include brace means which extend outwardly from the circular shaped sections; means are provided for mounting the spring ring means on the wheel cover such that the circular shaped sections are disposed behind the inner wheel cover member so as to be covered thereby and the web means are arranged axially in front of the respective brace means, the means for mounting the spring ring means includes guide means arranged on the web means for securing a position of the respective brace means in a circumferential direction, the guide means includes a pair of circumferentially spaced bearing means provided on an outer end of each of the web means for broadening an area of the respective web means, and in that an arcuate inner groove is provided in each of the bearing means for accommodating the brace means.

2. A wheel cover according to claim 1, characterized in that the wire spring means are mounted on the wheel cover under a pretensioning and in that the guide means form a radial abutment for the respective brace means.

3. A wheel cover according to claim 1, characterized in that each of the bearing means is integrally formed with and of the same material as the web means.

4. A wheel cover according to claim 3, characterized in that the material of the bearing means and web means is a synthetic resinous material.

5. A wheel cover according to claim 3, characterized in that the at least one vent slot is an annular shaped venting slot.

6. A wheel cover according to claim 5, characterized in that the web means extend radially outwardly at an oblique angle with respect to the circular shaped sections so as to form a fan arrangement.

7. A wheel cover according to claim 1, characterized in that the brace means of the bracket members and mutual angular circumferential spacing between the brace means corresponds to an angular circumferential spacing between the web means.

8. A wheel cover according to one of claims 1, or 2, characterized in that each brace means includes a pair of circumferentially spaced braces extending radially outwardly each bracket means further includes a cross web means for connecting the respective pairs of braces, and in that the cross web means are arranged radially and axially in front of each of the braces.

9. A wheel cover according to one of claims 1, or 2, characterized in that at least six bracket members are provided and are uniformly distributed about a circumference of the wire spring ring means, and in that at least one additional web for connecting the wheel cover members together is disposed between each adjacent pair of bracket members.

10. A wheel cover according to claim 9, characterized in that each of the brace means includes a pair of circumferentially spaced braces extending radially outwardly each of the bracket members further includes a cross web means for connecting the respective pairs of braces, and in that the web means are arranged radially and axially in front of each of the braces.

11. A wheel cover according to claim 1, characterized in that each of the bearing means is integrally formed with and is of the same material as the web means.

* * * * *